United States Patent [19]

Oshidari

[11] Patent Number: 4,955,260
[45] Date of Patent: Sep. 11, 1990

[54] HYDRAULIC CONTROL SYSTEM FOR TRANSMISSION

[75] Inventor: Toshikazu Oshidari, Yokohama, Japan

[73] Assignee: Nissan Motor Co., Ltd., Yokohama, Japan

[21] Appl. No.: 330,919

[22] Filed: Mar. 31, 1989

[30] Foreign Application Priority Data

Mar. 31, 1988 [JP] Japan .................................. 63-75974

[51] Int. Cl.⁵ ........................ B60K 41/14; F16H 11/04
[52] U.S. Cl. ......................................... 74/868; 74/866; 474/28
[58] Field of Search ................ 74/866, 867, 868, 869; 474/17, 28

[56] References Cited

U.S. PATENT DOCUMENTS

| | | | |
|---|---|---|---|
| 4,543,077 | 9/1985 | Yamamuro et al. | 474/12 |
| 4,579,021 | 1/1986 | Yamamuro et al. | 74/865 X |
| 4,674,359 | 6/1987 | Hattori | 474/28 X |
| 4,712,453 | 12/1987 | Haley | 74/866 |
| 4,718,308 | 1/1988 | Haley | 74/866 |
| 4,747,327 | 5/1988 | Itoh et al. | 74/868 |
| 4,763,545 | 8/1988 | Shibayama et al. | 74/868 |
| 4,764,155 | 8/1988 | Kumura et al. | 474/17 X |
| 4,895,552 | 1/1990 | Abo et al. | 474/28 |
| 4,904,229 | 2/1990 | Hattori | 474/28 X |

Primary Examiner—Leslie A. Braun
Assistant Examiner—Benjamin Levi
Attorney, Agent, or Firm—Foley & Lardner, Schwartz, Jeffery, Schwaab, Mack, Blumenthal & Evans

[57] ABSTRACT

There is shown a hydraulic control system for a transmission of the type wherein a gearing mechanism is combined with a V-belt type continuously variable transmission mechanism. The system comprises a hydraulic arrangement wherein a hydraulic fluid pressure supplied to a pulley cylinder chamber which the tension of the V-belt is variable with. The level of the hydraulic fluid pressure is elevated or increased immediately before or during shifting from the torque transmission through the gearing mechanism to the torque transmission through the V-belt type continuously variable transmission mechanism.

5 Claims, 6 Drawing Sheets

HYDRAULIC CONTROL SYSTEM FOR TRANSMISSION

BACKGROUND OF THE INVENTION

The present invention relates to a hydraulic control system for a transmission, and more particularly to a hydraulic control system for a hybrid transmission combining a gearing mechanism with a V-belt type continuously variable transmission.

The transmissions of the above kind are known and disclosed in Japanese patent application preliminary publication Nos. 57-191134, 56-97661, and 58-146756.

An object of the present invention is to provide an improved hydraulic control system wherein any slip of a V-belt of a V-belt type continuously variable transmission mechanism is prevented even when the V-belt is subjected to the torque variation upon shifting from the torque transmission through the gearing mechanism to the torque transmission through the V-belt type continuously variable transmission mechanism.

A specific object of the present invention is to provide a hydraulic control system wherein the level of the line pressure is kept at a sufficiently high level during the torque transmission through the V-belt type continuously variable transmission mechanism without increasing the level of the line pressure beyond the necessary level for the torque transmission through the gearing mechanism.

SUMMARY OF THE INVENTION

According to the present invention, there is provided a hydraulic control system for a transmission of the type wherein a gearing mechanism is combined with a V-belt type continuously variable transmission mechanism, the hydraulic control system, comprising a hydraulic arrangement wherein a hydraulic fluid pressure is supplied to a pulley cylinder chamber which the tension on the V-belt is variable with means for increasing the level of said hydraulic fluid pressure in response to shifting from the torque transmission through the gearing mechanism to the torque transmission through the V-belt type continuously variable transmission mechanism.

DETAILED DESCRIPTION OF THE EMBODIMENT

Referring to FIGS. 1 to 4, a first embodiment of a control system according to the present invention is described.

Figure 3:
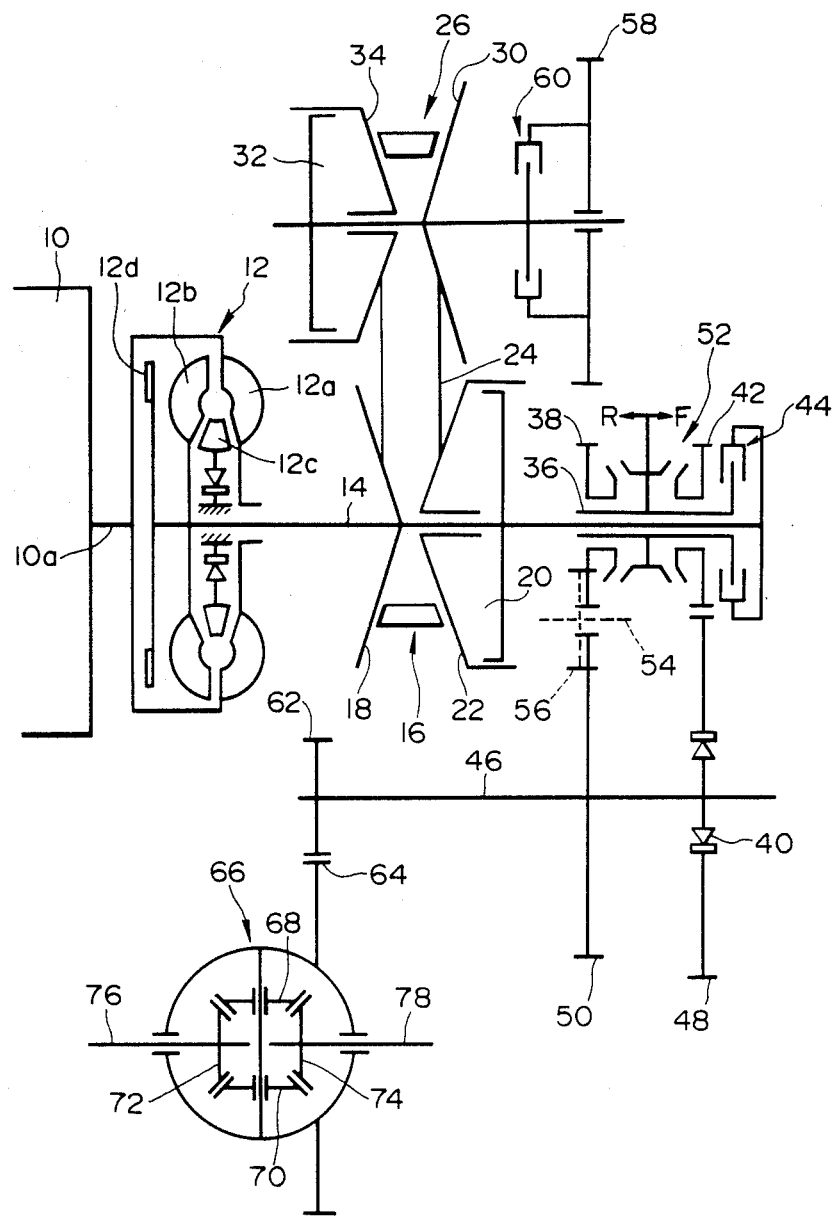
FIG. 3 is a schematic diagram of a transmission including a gearing mechanism combined with a V-belt type continuously variable transmission mechanism.
Figure 4:
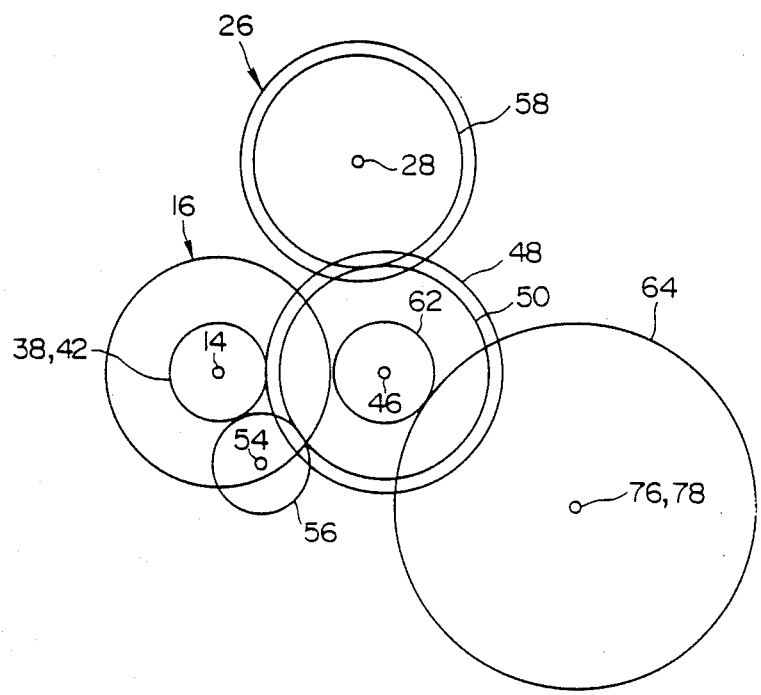
FIG. 4 is a diagram illustrating arrangement of a variety of different shafts of the transmission.

Referring now to FIG. 3, an engine 10 is shown as having an output shaft 10a which a torque converter 12 is coupled in the conventional manner. The torque converter 12 includes, as usual, a pump impeller 12a, a turbine runner 12b, and a stator 12c. It also includes a lock-up clutch 12d which the pump impeller 12a and turbine runner 12b are selectively interconnected with. The turbine runner 12b of the torque converter 12 is drivingly connected to a driver shaft 14. On the driver shaft 14 is a driver pulley 16. The driver pulley 16 includes an axially stationary conical member 18 fixedly connected to the driver shaft 14, and an axially movable conical member 22 connected to the driver shaft 14 in opposed spaced relationship with the stationary conical member 18. The conical members 18 and 22 define therebetween a V-shaped pulley groove therebetween. The driver pulley 16 includes a driver pulley cylinder chamber 20. The movable conical member 22 is axially movable toward the stationary conical member 18 in response to hydraulic pressure developed in the driver pulley cylinder chamber 20, causing the V-shaped pulley groove to decrease its width. The driver pulley 16 is drivingly connected via a V-belt 24 to a follower pulley 26. The follower pulley 26 includes an axially stationary conical member 30 fixedly connected to a follower shaft 28, and an axially movable conical member 34 connected to the follower shaft 28 for axial movement. The conical members 30 and 34 define therebetween a V-shaped pulley groove therebetween. The folower pulley 26 includes a follower pulley cylinder chamber 32. The movable conical member 34 is axially movable toward the stationary conical member 30 in response to hydraulic pressure developed in the follower pulley cylinder chamber 32. The driver pulley 16, V-belt 24, and the follower pulley 26 form a V-belt type continuously variable transmission mechanism. The setting is such that the maximum reduction ratio provided by this V-belt type continuously variable transmission mechanism only is smaller than the reduction ratio provided by a forward gear 42 on the driver shaft side and a forward gear 48 on the output shaft side, which are described later. The driver shaft 14 extends through a hollow shaft 36. The hollow shaft 36 is rotatably supported on the driver shaft 14. Rotatably supported on the hollow shaft 36 are a reverse gear 38 on the driver shaft side and a forward gear 42 on the driver shaft side. The forward gear 42 and the reverse gear 38 are selectively connected to the hollow shaft 36 by means of a mechanical selector in the form of a synchronous dog clutch 52 having a forward position (F position), a reverse position (R position), and a neutral position. Alternatively, a dog clutch without neutral may be used. With a drive reverse clutch 44, the driver shaft 14 is selectively connected to the hollow shaft 36. Extending in parallel to the driver shaft 14 is an output shaft 46. The output shaft 46 has the above-mentioned forward gear 42 mounted thereto via a one-way clutch 40 and a reverse gear 50 for unitary rotation therewith. The forward gear 48 is in constant mesh with the forward gear 42. The reverse gear 50 is in constant mesh with a reverse idler gear 56 that is rotatable with an idler shaft 54. The reverse idler gear 56 is in constant mesh with the reverse gear 38, too. In FIG. 3, since it is impossible to illustrate them in the cross sectional plane, the reverse idler shaft 54 and reverse idler gear 56 are illustrated by the broken line. Actually, they are arranged as illustrated in FIG. 4. In FIG. 3, the shaft distance and the gear diameter do not reflect the actual relationship. Thus, in order to know the actual relationship, reference should be made to FIG. 4. The follower shaft 28 has a forward gear 58. Via a high clutch 60, the forward gear 58 is connected to the follower shaft 28. As best seen in FIG. 4, the forward gear 58 is in constant mesh with the reverse gear 50. The forward gear 58 and the reverse gear 50 have the same diameter. The output shaft 46 has a reduction gear 62 for rotation therewith. The reduction gear 62 is in consant mesh with a final gear 64 of a differential 66. The differential 66 includes a pair of pinion gears 68 and 70 wich are rotatable with the final gear 64. A pair of side gear 72 and 74 mesh with the pinion gears 68 and 70. The side gears 72 and 74 are coupled with drive shafts 76 and 78, respectively, for rotation therewith.

The neutral state is provided when the drive reverse clutch 44 and the high clutch 60 are both released. In this state, the transmission of torque from the driver shaft 14 to the output shaft 46 is interrupted.

On start-up or hill-climbing where a relatively large driving force is required, the forward clutch 52 is engaged and the low clutch 44 engaged. The high clutch 60 is released. In this state, the torque of the output shaft 10a of the engine 10 is transmitted via the torque converter 12 to the driver shaft 14, and further to the hollow shaft 36 via the drive reverse clutch 44 that is engaged. The torque of the hollow shaft 36 is transmitted via the dog clutch 52 to the forward gear 42, and further to the forward gear 48 which the gear 42 meshes with. Owing to the fact that the forward gear 48 is drivingly connected via the one-way clutch 40 to the output shaft 46, the torque is transmitted to the output shaft 46. Thereafter, the torque is transmitted via the reduction gear 62 and the final gear 64 to the differential 66 where it is distributed between the drive shafts 76 and 78, causing wheels of the vehicle, not illustrated, to rotate. During the power transmission mentioned above, the torque is not transmitted through the V-belt type continuously variable transmission, but through the gearing mechanism. At the reduction ratio provided by the intermeshed forward gears 42 and 48, the torque is increased, thus providing a relatively large driving force.

When the operating condition develops and demands a less driving force, the high clutch 60 is engaged with the above described state maintained. This cause the torque transmission through the V-belt type continuously variable transmission. The torque of the driver shaft 14 is transmitted via the V-belt 24 and the follower pulley 26 to the follower shaft 28, and further to the forward gear 58 via the high clutch 60 that is engaged. Since the forward clutch 58 meshes with the reverse gear 50, the torque is transmitted to the output shaft 46, and further to the driver shafts 76 and 78 via the same power path as previously described. In this case, the output shaft 46 rotates at a higher speed than the forward gear 48 does, and thus the one-way clutch 40 idles. This allows the drive reverse clutch 44 to be kept engaged. In the manner as described above, the torque is transmitted by the V-belt continuously variable transmission mechanism. Thus, the reduction ratio can be varied continuously by varying the width of the V-groove of the driver pulley 16 which in turn inducs variation in the width of the follower pulley 26.

In establishing the reverse state, the dog clutch 52 is shited to the R position, causing the reverse gear 38 to rotate with the hollow shaft 36 as a unit, and the drive reverse clutch 44 is engaged with the high clutch 60 released. In this state, the torque of the drive shaft 14 is transmitted via the drive reverse clutch 44, the hollow shaft 36, the dog clutch 52, the reverse clutch 53, the reverse gear 38, the reverse idler gear 56 and the reverse gear 50 to the output shaft 46. Since the reverse idler gear 56 is disposed in the power transmission path, the rotational direction of the output shaft 46 is the opposite to the rotational direction of the output shaft 46 in the cases previously descibed. Thus, the vehicle can travel in the reverse direction.

Figure 1:
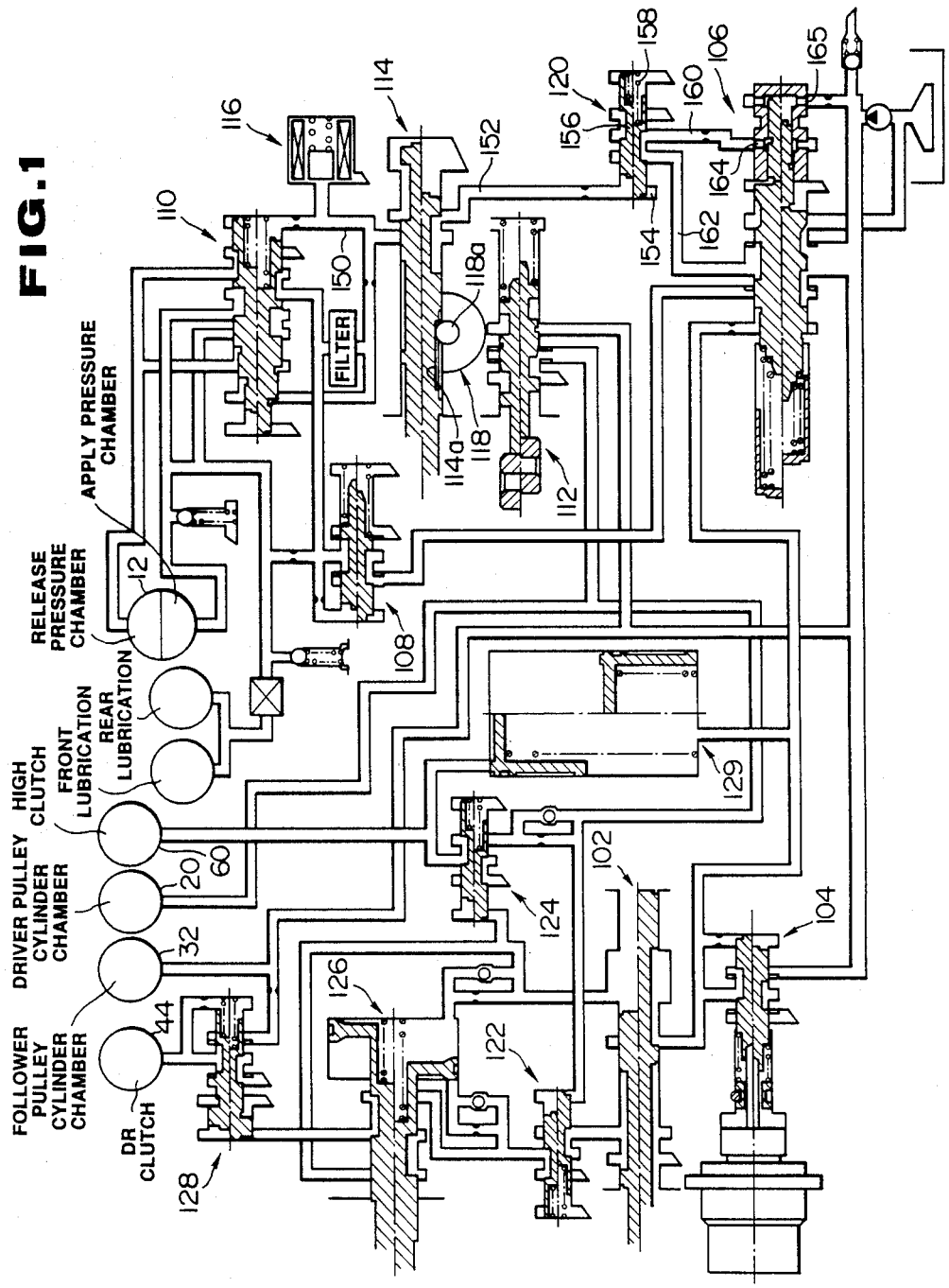
FIG. 1 is a first embodiment of a hydraulic control system according to the present invention.

Referring to FIG. 1, a control system for this transmission is now described. The control system carries out mainly a shift control. The system generally comprises a manual valve 102, a throttle valve 104, a line pressure regulator valve 106, a torque converter pressure reduction valve 108, a lock-up control valve 110, a shift control valve 112, a shift command valve 114, a solenoid valve 116, a stepper motor 118, a line pressure servo valve 120, a reverse inhibitor valve 122, a neutral valve 124, a shift valve 126, a drive reverse clutch pressure amplifier valve 128, and a high clutch accumulator 129. The drive reverse clutch 44, high clutch 60, driver pulley cylinder chamber 20, follower pulley cylinder chamber 32, and an apply pressure chamber and a release pressure chamber of the torque converter 12 are connected to the above-mentioned hydraulic elements. The manual valve 102, a directional control valve serving as a drive range position selector, is operatively connected with a select lever to be manually operated by a driver. The throttle valve 104 effects pressure regulation in response to engine intake manifold vacuum and generates a throttle pressure which is in inverse proportion to the magnitude of the manifold vacuum. The line pressure regulator valve 106 is a valve to adjust the pressure of hydraulic fluid discharged by the oil pump, no numeral. The torque converter pressure reduction valve 108 is a pressure regulator valve to keep the pressure supplied to the torque converter 12 in a predetermined state. The lock-up control valve 110 is a valve to control engagement/release of a lock-up clutch. The shift control valve 112 is a valve to control shifting in the V-belt type continuously variable transmission. The shift command valve 114 is actuated by the stepper motor 118 and issues a command for a reduction ratio which the V-belt type continuously variable transmission should shift. The solenoid valve 116 has a task to control the lock-up control valve 110 and another task to control the line pressure. The stepper motor 118 actuates the shift command valve 114 in response to an output signal of a control unit. The line pressure servo valve 120 is a valve to control the line pressure in a manner described later. The reverse inhibitor valve 122 is a valve to prevent interlock which otherwise would be caused when the high clutch 60 and the reverse clutch 44 are engaged simultaneously. The neutral valve 124 is a valve to securely provide the neutral state. The shift valve 126 is a valve to shift the dog clutch 52. The high clutch accumulator 129 is an accumulator to alleviate shock upon engagement by the high clutch 60. The driver reverse clutch amplifier valve 128 is a valve to control hydraulic fluid pressure supplied to the drive reverse clutch 44.

Hereinafter, the line pressure regulator valve 106, the shift command valve 114, the solenoid valve 116, the line pressure servo valve 120 are further described.

The solenoid valve 116 adjusts the hydraulic fluid pressure in a hydraulic fluid conduit 150 in response to a duty signal generated by the control unit. The shift command valve 114 includes a rack 114a in mesh with a pinion 118a for axial movement in response to actuation of the stepper motor 118. While the stepper motor 118 is operating in a range defined by a rotary position corresponding to the minimum reduction ratio and another rotary position corresponding to the maximum reduction ratio, the shift command valve 114 assumes a state where a hydraulic fluid conduit 150 is allowed to communicate with a hydraulic fluid conduit 152. However, when the stepper motor 118 has rotated beyond the maximum reduction ratio corresponding position into an overstroke range, the shift command valve 114 assumes another state where the fluid communication between the hydraulic fluid conduits 150 and 152 is interrupted. The conduit 152 is connected to a port 154 of the line pressure servo valve 120. The spool 156 of the line pressure servo valve 120 is shiftable when a predetermined relation between the hydraulic fluid pressure at the port 154 and the force of a spring 158 is accomplished. When the hydraulic fluid pressure at the port 154 is larger than a predetermined value, the line pressure servo valve 120 assumes a state where a hydraulic fluid line 160 is drained. When the hydraulic fluid pressure at the port 154 is less than the predetermined value, the line pressure servo valve 120 assumes another state where the hydraulic fluid conduit 160 is allowed to communicate with a hydraulic fluid line 162. This conduit 162 is a line pressure conduit which is always supplied with the line pressure. The hydraulic fluid conduit 160 is connected to a feedback port 164 which when supplied with the line pressure causes a drop in the line pressure. The line pressure regulator valve 106 is formed with another feedback port 165 that is always supplied with the line pressure.

Figure 2:
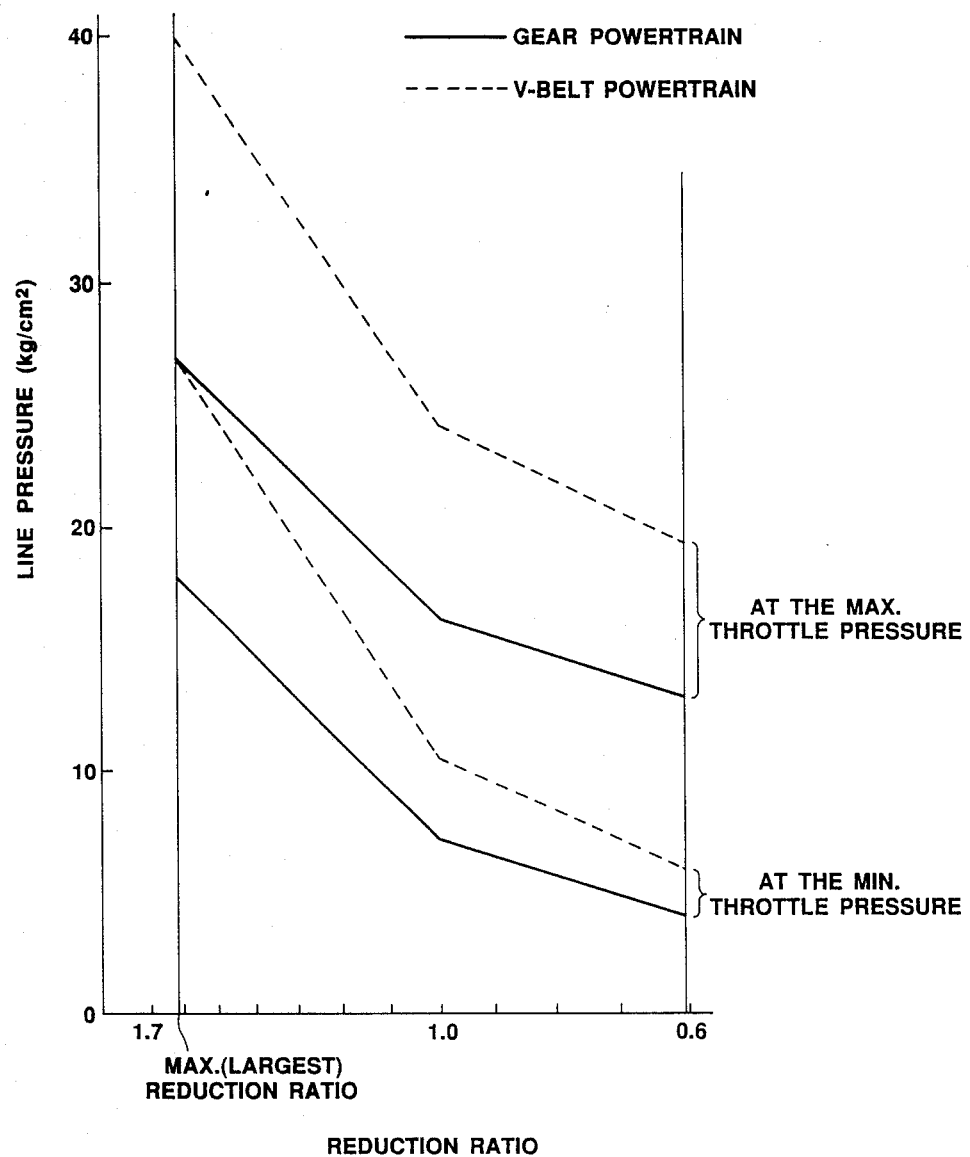
FIG. 2 is a graphical representation of variation of line pressure versus reduction ratio.

The operation of this embodiment is described. On start-up of the vehicle, the stepper motor 118 operates within the overstroke range disposed beyond the maximum reduction ratio established by the V-belt continuously variable transmission mechanism, and the shift command valve 114 assumes the state to interrupt the communication between the conduits 150 and 152 and to drain the conduit 152. Thus, no hydraulic fluid pressure is applied to the port 154, so that the line pressure servo valve 120 allows the communication between the conduits 160 and 162. In this state, the hydraulic fluid pressure is supplied to the feedback port 164 of the line pressure regulator valve 106, causing the line pressure regulator valve 106 to generate the line pressure at a relatively low level. When, subsequently, the shift command valve 114 has moved out of the overstroke range beyond the maximum reduction ratio corresponding position, the conduit 150 is allowed to communicate with the conduit 152, rendering the solenoid valve 116 to adjust the hydraulic fluid pressure at the port 154 of the line pressure servo valve 120. In this state, the solenoid valve 116 causes the hydraulic fluid pressure in the conduit 150 to increase, and this increased hydraulic fluid pressure is applied to the port 154, urging the line pressure servo valve 120 to shift to the state where the hydraulic fluid conduit 160 is drained. As a result, no hydraulic fluid pressure is applied to the feedback port 164 of the line pressure regulator valve 106, causing the line pressure regulator valve 106 to generate the line pressure at a relatively high level. Since the line pressure is elevated to the relatively high level immediately before the V-belt type continuously variable transmission starts transmitting the torque, there occurs no slip of the V-belt 24 even when the V-belt type continuously variable transmission mechanism is subjected to any impact owing to some torque variation. Thereafter, the high level of the line pressure is maintained when the V-belt type continuously variable transmission mechanism shifts between the minimum and maximum reduction ratios. The solenoid valve 116 has another function to control the lock-up control valve 110. FIG. 2 shows how line pressure varies versus the reduction ratio. The fully drawn lines denote the variation of the line pressure when the torque is transmitted through the gearing mechanism (gear powertrain), whereas the broken lines denotes the variation of the line pressure when the torque is transmitted through the V-belt type continuously variable transmission mechanism (V-belt powertrain).

In order to understand more the hydraulic circuit shown in FIG. 1, reference should be made to European Patent application published under publication No. 0180209 on May 7, 1986 which corresponds to U.S. patent application Ser. No. 922,400, now U.S. Pat. No. 4,735,113 issued to Yamamuro et al. on Apr. 5, 1988.

Figure 5:
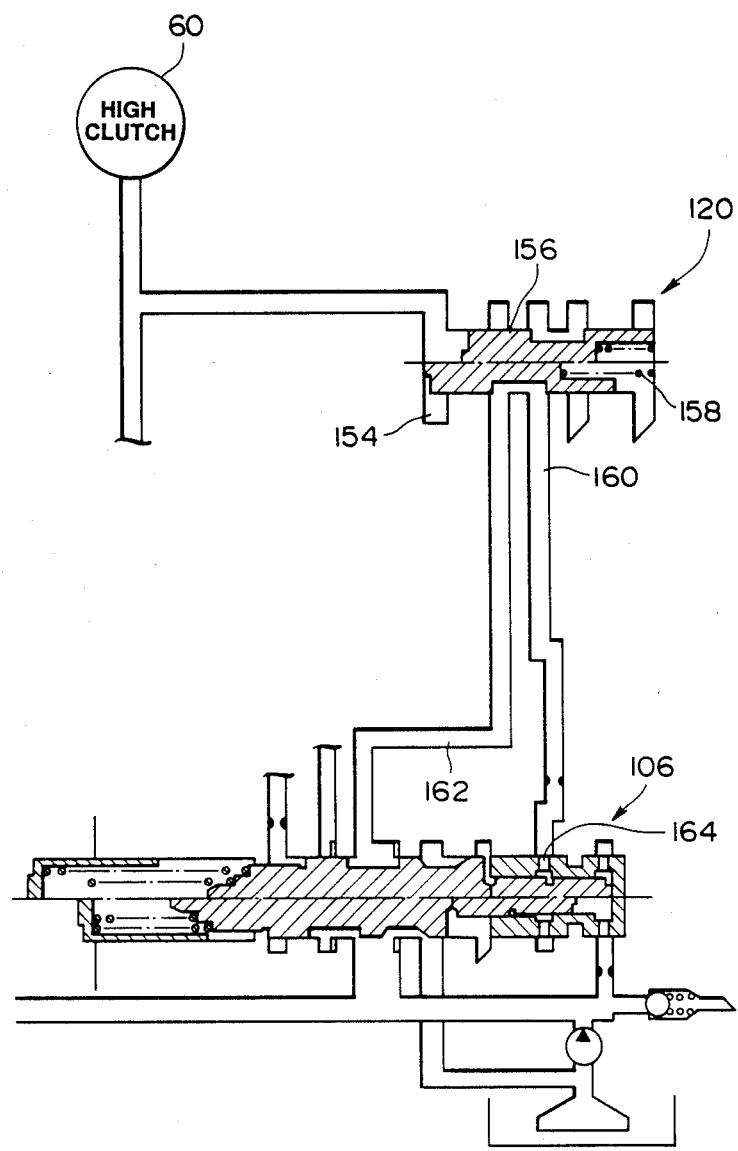
FIG. 5 is a portion of a second embodiment of a hydraulic control system according to the present invention.

Referring to FIG. 5, a second embodiment according to the present invention is described. In this embodiment, a line pressure servo valve 120 is rendered to be shiftable in response to hydraulic fluid pressure supplied to a high clutch 60. Since the hydraulic fluid pressure in the high clutch 60 increases before a shift is made to the torque transmission through the V-belt type continuously variable transmission mechanism, a hydraulic fluid conduit 160 is drained in response to the increase in the hydraulic fluid pressure in the high clutch 60, causing the line pressure to increase to a relatively high level.

Figure 6:
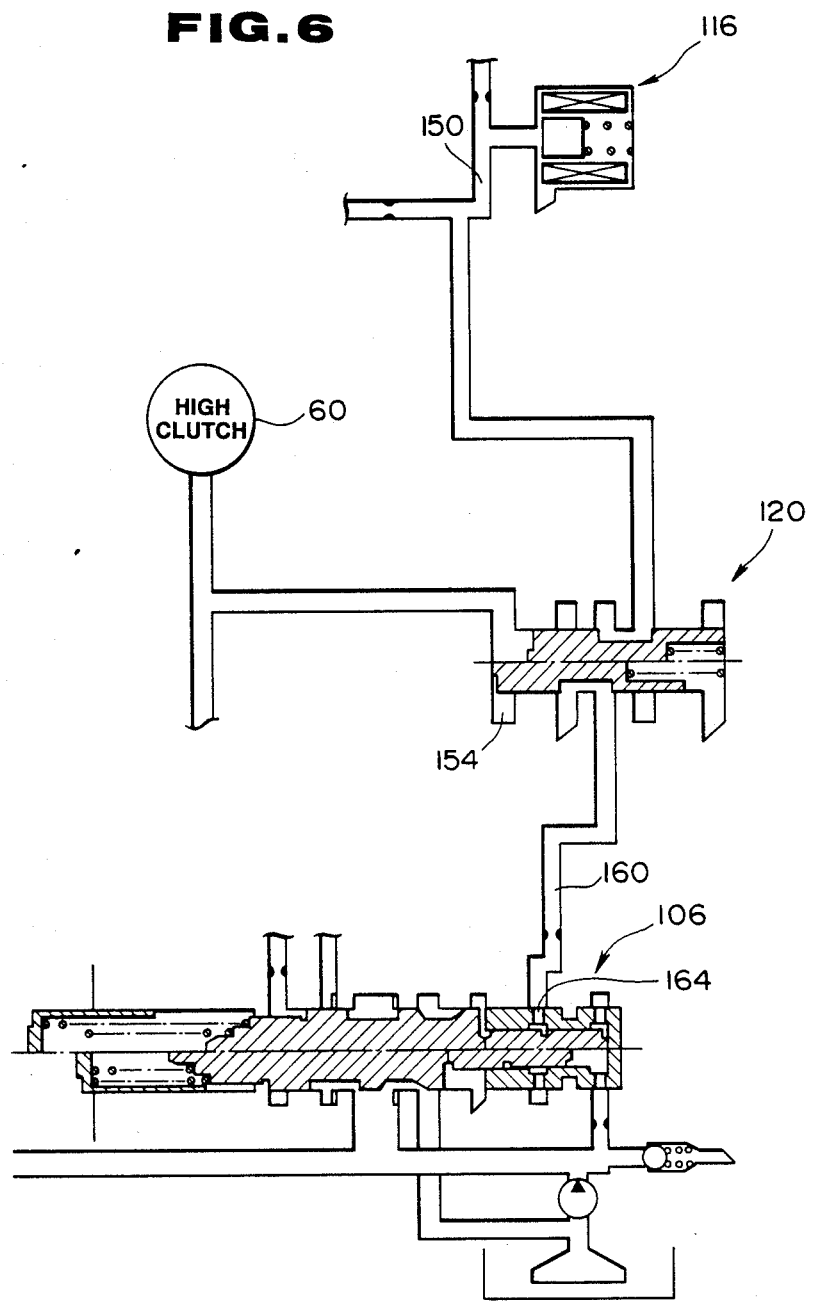
FIG. 6 is a portion of a third embodiment of a hydraulic control system according to the present invention.

Referring to FIG. 6, a third embodiment according to the present invention is described. According to this third embodiment, the hydraulic fluid pressure supplied to a high clutch 60 is used to cause a line pressure in servo valve 120, also, the hydraulic fluid pressure adjusted by solenoid valve 116 is supplied to feedback port 164 of line pressure regulator valve 106 when the high clutch 60 has been engaged. In this third embodiment, the line pressure is modulated by the solenoid valve 116 in a desired manner after the engagement of high clutch 60.

What is claimed is:

1. A hydraulic control system for a transmission of the type wherein a gearing mechanism is combined with a V-belt type continuously variable transmission mechanism, the hydraulic control system comprising:
 a hydraulic arrangement wherein a hydraulic fluid pressure is supplied to a pulley cylinder chamber which the tension on the V-belt is variable with;
 means for increasing the level of said hydraulic fluid pressure in response to a shifting from transmission of torque through the gearing mechanism to the transmission of torque through the V-belt type continuously variable transmission mechanism.

2. A hydraulic control system as claimed in claim 1, wherein said increasing means include a shift command valve, a line pressure regulator valve, and a line pressure servo valve.

3. A hydraulic control system as claimed in claim 2, wherein a hydraulic fluid conduit is drained responsive to the increase in the hydraulic fluid pressure thereby causing said line pressure regulator valve to generate line pressure at a relatively high rate.

4. A hydraulic control system as claimed in claim 1, wherein said increasing means include a line pressure regulator valve, and a line pressure servo valve shiftable responsive to the hydraulic fluid pressure supplied to a high clutch.

5. A hydraulic control system as claimed in claim 4, wherein a solenoid valve is provided to modulate the level of line pressure via said line pressure servo valve.

* * * * *